March 24, 1931. J. A. DIRSCHAUER 1,797,824

ROTARY SOIL CUTTER OR CULTIVATOR

Filed April 25, 1928

Inventor,
Jacob August Dirschauer
By [signature]
Atty.

Patented Mar. 24, 1931

1,797,824

UNITED STATES PATENT OFFICE

JACOB AUGUST DIRSCHAUER, OF EVANSVILLE, INDIANA, ASSIGNOR OF ONE-THIRD TO ORWIC E. SEILER, OF EVANSVILLE, INDIANA

ROTARY SOIL CUTTER OR CULTIVATOR

Application filed April 25, 1928. Serial No. 272,796.

This invention relates to that general class of rotary cutters designed to cultivate soil, and it has for its object the provision of a single improved cutter or cultivator embodying independent toothed blades or cutting sections carried by the arms of a spider, each of said sections being arranged angularly to the general plane of the rotary cutter to provide an irregular and relatively wide periphery for said cutter, with intervening spaces, so that each blade or section will "clear" itself, will be adapted for substitution or removal without necessitating disturbing the remaining sections or blades, and each blade may be arranged at a desired angle; and the blades will collectively be adapted to break up and tear apart a relatively wide section of soil.

Figure 1:
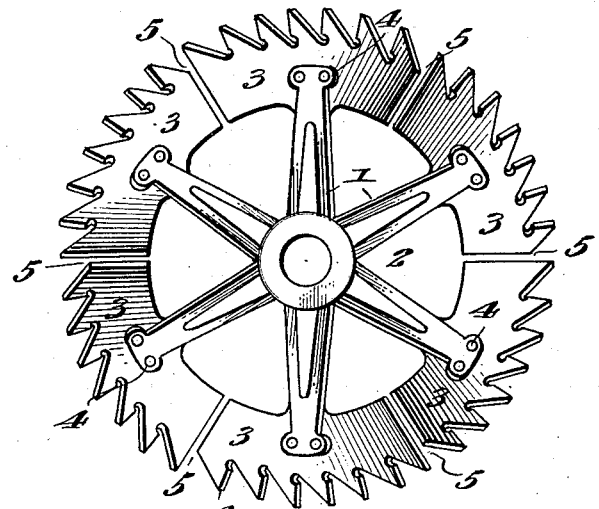
Figure 1, is a front view of one embodiment of the invention.
Figure 2:
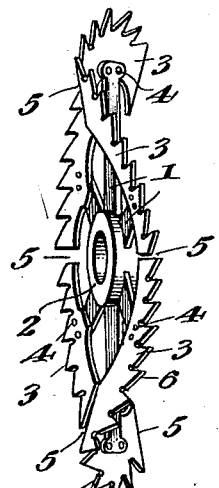
Fig. 2, is an edge view thereof.

Referring first to Figs. 1 and 2, there is illustrated a six-armed spider 1 provided with a suitable hub 2, constituting the carrier for the cutting blades or sections 3, there being six blades, respectively bolted or detachably fastened to the ends of the arms of the spider at 4.

Figure 3:
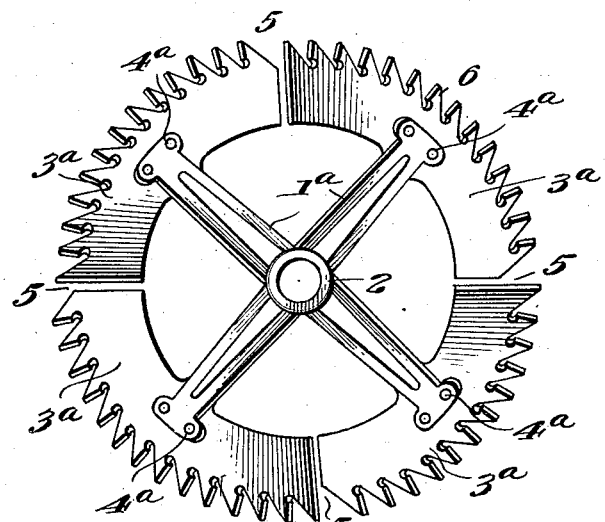
Fig. 3, is a front view of another embodiment.
Figure 4:
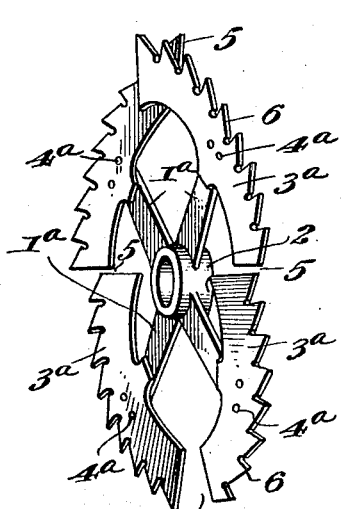
Fig. 4, is an edge view of the embodiment of Fig. 3.

In Figs. 3 and 4, the spider 1 has four arms 1ª, and there are four blades or sections 3ª detachably connected thereto at 4ª.

In each embodiment of the invention, each blade or cutter 3, or 3ª, is angularly arranged, that is, it is disposed at an angle to the general plane of the spider and to the general plane of the entire cutter.

In the embodiment shown in Figs. 1 and 2 successive blades are disposed at an angle to each other, giving a general irregular effect as the cutter is viewed at its edge or periphery. The blades do not connect with each other but, on the contrary, there are clearing spaces 5 between the ends of the blades.

In the embodiment disclosed in Figs. 3 and 4 alternate blades are disposed at an angle to each other, affording an irregular effect as the cutter is viewed at its edge or periphery.

Each blade is provided with saw-teeth 6 which, as shown, have points and front cutting edges, and rear sloping "clearing" edges, so that they will shed the soil and growths. The spaces 5 enable each blade, as an entirety, to shed the soil and growths.

By arranging the blades in irregular fashion, the cutting edge or periphery presented to the soil is relatively wide.

What I claim is:

1. A rotary soil cutter having its peripheral part comprising separated and independent blades or sections disposed in end to end relationship and each provided with teeth on its edge, each of said sections as an entirety being arranged in angular relationship to the general plane of the soil cutter.

2. A rotary soil cutter having similar independent blades or sections each provided with a row of similar teeth lying in the same plane as the section carrying them, each of the sections as an entirety being disposed at an angle to a succeeding section and to the general plane of the soil cutter and collectively constituting the periphery of the cutter.

3. A rotary soil cutter having a spider and similar independent blades or sections each provided with a row of similar teeth, said sections being independently attachable to, and detachable from, the arms of the spider of said soil cutter and interchangeable with each other.

In testimony whereof I affix my signature.

JACOB AUGUST DIRSCHAUER.